Jan. 21, 1964 E. M. BYER ETAL 3,118,776
PRODUCTION OF FLAVOR-ENHANCED CITRUS CONCENTRATES
Original Filed Dec. 16, 1959
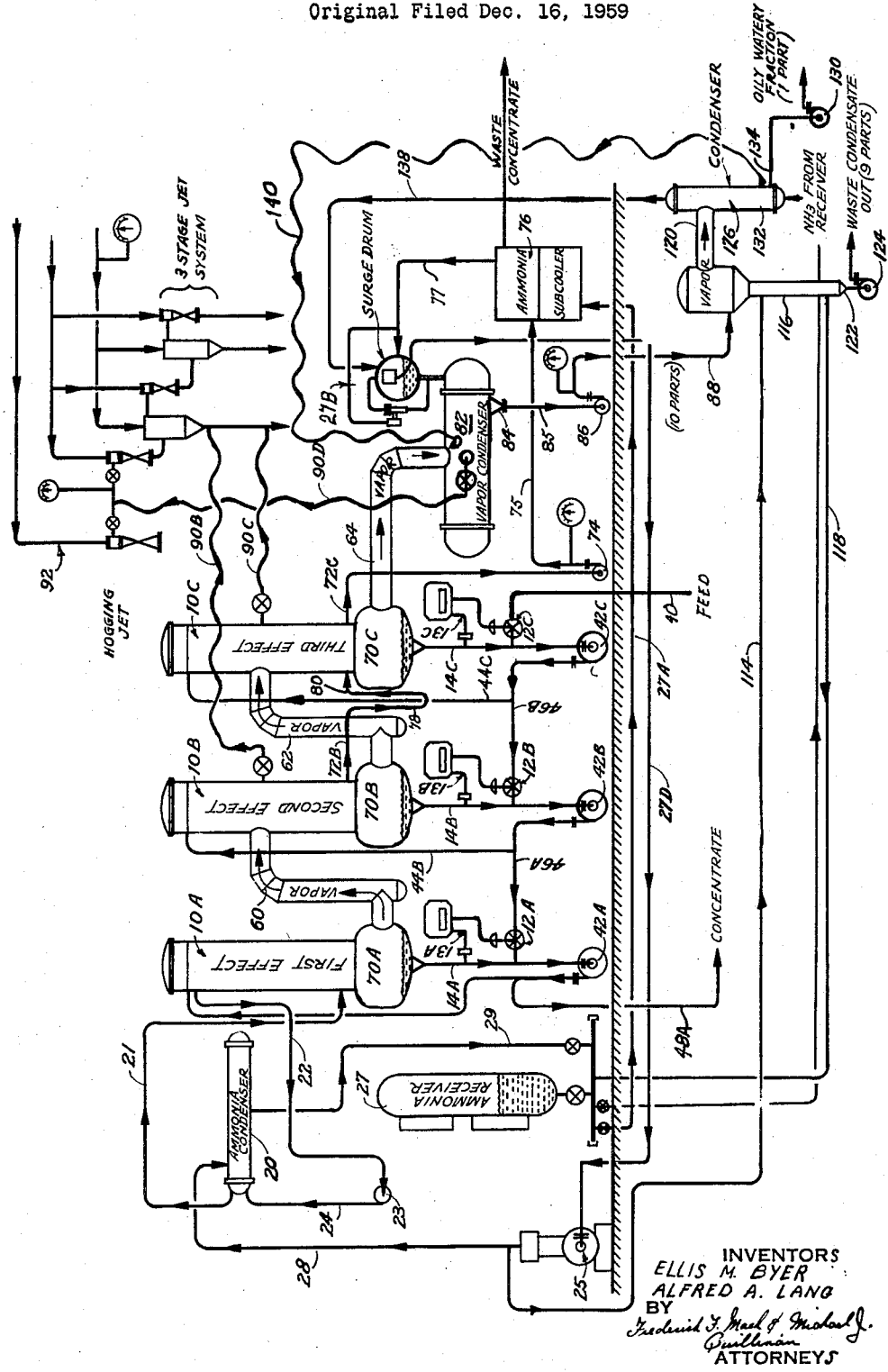
INVENTORS
ELLIS M. BYER
ALFRED A. LANG
BY
ATTORNEYS

United States Patent Office 3,118,776
Patented Jan. 21, 1964

3,118,776
PRODUCTION OF FLAVOR-ENHANCED CITRUS CONCENTRATES
Ellis M. Byer, Turlock, Calif., and Alfred A. Lang, Winter Haven, Fla.
Continuation of application Ser. No. 859,885, Dec. 16, 1959. This application Dec. 3, 1962, Ser. No. 247,429
13 Claims. (Cl. 99—205)

The present invention relates to the production of flavor-enhanced citrus and orange concentrates and, more particularly, to a process for the recovery from citrus and orange fruit juices of volatile constituents useful for such enhancement.

This application is a continuation of our application Serial No. 859,885, filed December 16, 1959, under the title of "Production of Flavor-Enhanced Vegetable Concentrates," which is now abandoned.

It is an object of the present invention to provide a process whereby a volatile flavor fraction can be recovered from fruit juices, typically citrus juices, in a simple and practical manner whereby concentrates of those juices can be fortified with a fresh fruit-like flavor which they otherwise would not offer.

A specific object of the invention is to provide means whereby a high yield of a desired citrus fruit flavor fraction can be recovered simply without employing sophisticated plant equipment.

A still further object of the invention is the recovery of flavorful essences from citrus fruit juices in a condition whereby such essences can be restored to a juice concentrate and will offer to the reconstituted juice fresh fruit flavors even after prolonged storage.

Heretofore, it has been proposed to flavor-enhance juice concentrates by recovering most of the volatile flavor-producing constituents evaporated in the course of concentrating fruit juices. These constituents have various high and low boiling points. Thus, the art has been concerned in the past with the problems encountered in collection of all or most of these constituents. Suggested procedures have called for condensation, absorption, or other means for separation and collection of volatile essences, including esters, alcohols, aldehydes and other organic constituents calling for employment of a wide range of temperatures and pressures. Hence, it has been proposed to collect the volatile essences produced in the course of partial evaporation of a citrus juice by means of multi-stage condensers at progressively reduced temperatures; for example, it has been proposed to employ a first-stage condensation above 32° F., a second-stage condensation below 32° F. in the neighborhood of a cold brine solution, and a third-stage condensation in neighborhoods less than —130° F. Clearly, such collection techniques are wasteful of expensive refrigerants such as liquid nitrogen, liquid air, and the like, and require complex condensate handling means which limit the applicability of such procedures on a wide scale in the juice concentration art. Moreover, such collection techniques involve the recovery of a large quantity of low molecular weight gases such as nitrogen, carbon dioxide, oxygen and other non-condensibles which have a high diffusivity, create a high velocity and hinder the ability to condense the desired volatile essences on a practical scale.

Others in the art have suggested procedures whereby flavor values produced in the course of a partial evaporation of a juice are condensed at less reduced temperatures; here also, however, the prior art workers have mainly been concerned with the collection of as much as possible of these volatile constituents, including the more volatile materials and, as a consequence, have suggested the use of relatively complex packed fractionating columns, singly or in series. Such means generally place a substantial burden upon plant investment and operation and have not been found to produce an adequate yield or quality of flavoring material for use in fortification of concentrates. In the main, such techniques have been concerned with the recovery of constituents which boil at temperatures lower than the boiling point of water, and hence have not involved the recovery as well of constituents which boil at temperatures higher than the boiling point of water. Although low boiling constituents offer some fragrance reminiscent of fresh juice, they are recovered at only a minor relatively inconsequential level such that their use in large quantities on a commercial basis is impractical.

The present invention provides a procedure whereby a high yield of useful volatile citrus flavoring constituents can be recovered in a practical concentration for subsequent use in a manner which satisfies the aforementioned objects. Advantageously and unexpectedly this specific flavor fraction is recovered under only moderately reduced working temperatures and, surprisingly, is isolated from volatile fractions heretofore considered commercially useless and, hence, discarded. The procedure of the present invention is not complicated, therefore, by the use of drastically reduced condensation temperatures, can be combined with existing plant installations at a relatively small additional capital investment, and in use does not place an undue burden on plant production requirements.

The present invention is applicable to a variety of citrus fruit juices which range in their sensitivities to operating temperatures. The term "fruit" as it is employed herein and in the accompanying claims is intended to apply to citrus juices such as those from orange, grapefruit, tangerine, and the like. The term "juices" is employed to include extracts, nectars, purees, and, generally, citrus liquids separated from citrus plant tissue by mechanical extraction or by solution and which may contain therein food solids as well as liquids, all of which are desirably concentrated by at least partial evaporation of water therefrom.

The present invention recovers the aforesaid specific fraction of volatile constituents from citrus fruits juices by a series of steps, which comprise:

(a) Causing the citrus fruit juice to flow rapidly, preferably in a thin, continuous film, over a heat exchange surface which is under a substantially reduced subatmospheric pressure, typically less than 1½" of mercury, in a closed system to partially concentrate the juice by separating it into a major juice concentrate portion and a minor volatile portion condensed to include flavor-producing volatile constituents boiling at temperatures higher and lower than that of water and to exclude non-condensible gaseous constituents. The temperatures employed to effect such separation will be dependent in great measure upon the identity of the citrus juice being processed. The juice temperature generally does not exceed 120° F. at any point in its flow over the heat exchange surface and, more ideally, the citrus juice is caused to travel at temperatures above about 40° F. and below about 80° F.

(b) The aforesaid volatile fraction produced by the first step is thereafter subjected to condensation continuously, at such temperatures that the volatile flavor-producing constituents are collected as a two-phase oily-watery mixture. Advantageously, the temperatures at which this oily-watery mixture may be collected by condensation may be only moderately reduced, typically 30°–70° F. Usually, it is found that the desired condensate collected is in the neighborhood of 5–15% by weight of the juice initially introduced to the evaporation system or third effect vaporization chamber;

(c) The aforesaid two-phase mixture is thereafter separated into a minor subfraction containing desirable high as well as low boiling flavor-producing constituents and a major subfraction containing mainly previously condensed water and an undesirable quantity of oily flavor-producing constituents. It is this minor subfraction which has been found offers the desirable flavor enhancement to the juice concentrate. Such separation can be carried out by azeotropic distillation of the two-phase mixture under absolute pressures of less than 1½″ of mercury at temperatures of 50°–100° F. or by any other process yielding substantially the same minor subfraction, as will be described hereinafter. The desirable subfraction which is collected comprises as a major proportion a watery phase and as a minor proportion an oily phase. This minor subfraction may be collected by condensation at temperatures of 30°–70° F. as will be described hereinafter. Preferably the minor subfraction is further subdivided by allowing the watery and oily phases to separate one from another upon standing, the watery phase being continuously removed from the bottom of this separation while accumulating an oil level on the surface; upon sufficient oil accumulation, this oil is drained off separately and subsequently mixed with a quantity of suitable high boiling organic material, typically cold press citrus oil, e.g., cold press orange oil. For the purposes of the present invention it is preferred that this minor subfraction be collected by condensation in a closed system, that is one where no external vapors are introduced to the minor subfraction.

The minor subfraction of use generally represents about 0.5–1.5% by weight of the whole juice. The specific subfraction of citrus juices like orange and grapefruit is relatively colorless and has a light, cloudy appearance stemming from the emulsification therein of the minute quantity of oily material associated therewith, which minute quantity makes a desirable flavor contribution. The specific subfraction of use is ideally recoverable by evaporation at only moderately elevated temperatures and by condensation at temperatures ranging above 30° F. and upwardly to 70° F. when employing absolute pressures in the neighborhood of less than ½ in. of Hg; however, this fraction may also be condensed at temperatures below 30° F. by means of a brine solution or other refrigerating means which, depending on the temperature of condensation, may cause icing in the collection vessel and which permit recovery of the fraction as a snow rather than liquid.

It will be recalled that the foregoing process for recovering the volatile fruit flavor fraction desired may be carried out under subatmospheric pressures at only moderately elevated temperatures in the initial whole juice concentration step; the juice concentrate portion may be subsequently introduced on either a continuous or batch basis to further heat exchange equipment wherein it may be caused to again travel in the form of a thin film over one or more heat exchange surface also maintained under subatmospheric pressures but at higher temperatures whereby the more concentrated juices will be reduced in viscosity and thereby more effectively concentrated. Thus, most citrus juices call for moderate evaporating temperatures at least in the initial stages of concentration and, hence, it has been found useful in the present process to employ highly volatile so-called refrigerant gases, typically ammonia, which when compressed contain sufficient latent as well as sensible heat to boil the desired volatile constituents. Since the desired flavor fraction is collectable by condensation at temperatures above 30° F., a continuous heat exchange cycle employing such refrigerant gases is ideally suited to the present process; thus, after the compressed refrigerant gas has surrendered its heat to the juice or juice concentrate, it can be employed in its liquid state to remove sensible heat as well as the heat of condensation from the distilled fraction, the heat of which can be reused to heat the liquid refrigerant for subsequent cycles. The heat of a compressed refrigerant gas may be utilized directly to boil further quantities of juice or it may be employed indirectly through transfer to another medium such as water which could serve in boiling the juice or the concentrate. However, it is not intended that the present process be restricted to the use of such refrigerant gases since steam may be introduced to the heat exchange surface to effect juice concentration as well as redistillation of the two-phase oily watery mixture and since cold water can be employed to condense the minor volatile portion separated from the initial concentration step as well as the redistillated volatile fraction.

For citrus juice concentration it is preferred that the non-condensibles not be collected so that the redistilled condensate employed for flavor enhancement is relatively free of those materials like carbon dioxide and oxygen which impair the flavor values of the concentrate even at temperatures below 0° C. Thus, in the case of orange and grapefruit juice it is preferred that the non-condensibles and the difficultly condensible volatile vapors be evacuated from the initial concentration of the juice in a non-oxidizing atmosphere and discarded, thereby freeing the first two-phase oily-watery mixture collected of interference from such non-condensibles and highly volatile constituents stemming from their high gas velocities and resulting in more stable juice concentrates fortified with the specific flavor fraction of the present invention. In this connection it is noteworthy that the citrus juice concentrates fortified with this flavor fraction have been characterized by their improved freedom from oxidative changes and the accompanying ability to avoid use of costly nitrogen packaging.

Ideally, the specific flavor fraction of use may be mixed in liquid form with the juice concentrate thereby offering the advantages of a simple plant recirculation. However, it has been found that a rather prolonged shelf-life for flavor-enhanced concentrate is achieved when the specific flavor fraction of use is frozen into individual portions or pieces, typically cubes or discs, which are introduced to the juice concentrate in the can or other package just prior to freezing. It appears that, by maintaining the specific flavor fraction in a frozen condition separate from the frozen concentrate, the flavor values of the product are maintained over an unusually long period of time.

The invention will now be more fully described by reference to the accompanying drawing. The figure is a schematic view of a typical plant operation for carrying out juice concentration and flavor and enhancement in accordance with this invention.

Referring to the figure, the system will be seen to comprise a triple effect evaporator into which a compressed refrigerant gas is introduced to supply heat for boiling orange juice indirectly through recirculated water. However, the present invention is not to be restricted to the modification of the orange juice concentrator to be described herein since apparatus capable of employing a hot compressed refrigerant gas in a direct heat exchange relationship with boiling juices may also be employed, typically the system disclosed in U.S. Patent No. 2,570,210 to Joseph A. Cross, issued October 9, 1951.

For the preferred orange juice concentrator of the present invention, a series of connected falling film type evaporator units 10A, 10B and 10C are employed, each unit comprising a vertical tubular evaporator having a shell and a nest of tubes (not shown) which are retained by suitable upper and lower tube sheets (not shown) in the shell. In the first effect evaporator 10A water is recirculated through a hot refrigerant gas condenser 20 of the shell and tube-type where the heat of the hot gas is transferred through the walls of the tubes, water heated thereby being brought into heat exchange relationship with the tubes of evaporator unit 10A by means of hot water line 21. After the water in the first effect evaporator unit 10A has been brought into heat exchange relationship with the tubes therein to elevate the juice temperature and volatilize low and high boiling aromatic constituents therein, the water is withdrawn from the top of the evaporator through pipe 22, water being recirculated to condenser 20 by means of pump 23 and pipe 24. A suitable ammonia compressor 25 communicating with ammonia condenser 20 through ammonia gas line 23 compresses ammonia vapor whereby hot ammonia gas is delivered into heat exchange relation with gas condenser 20, condensed liquid ammonia collected in condenser 20 flowing into ammonia receiver 27 through line 29. Liquid ammonia in receiver 27 is floated on ammonia line 27A to maintain an adequate supply of liquid ammonia for level control means 27B of vapor condenser 82.

Fresh juice is supplied to evaporator unit 10C through a suitable feed pipe 40. Feed pipe 40 preferably is located to feed fresh juice just below the level of liquid in sump 70C. A flow control valve 12C being located in pipe 40 controlling the rate at which fresh juice is delivered to sump 70C and being operated under the control of pneumatic level control means 13C in communication with tail pipe 14C for sump 70C. Fresh juice entering the sump 70C is delivered by tail pipe 14C to circulator pump 42C which delivers a portion of fresh dilute juice through pipe 44C to the upper extremity of evaporator unit 10C and another portion of fresh juice through pipe 46B for evaporation in the second effect evaporator unit 10B, a majority of the juice being delivered to the third effect evaporator unit 10C. Fresh juice entering the third effect concentrator 10C flows downwardly within each of the tubes therein (not shown), the juice being distributed in the tubes by means of a header having suitably mounted therein distributor tubes, a distributor tube being mounted at the upper extremity of each heat exchange tube for assuring uniform distribution of the juice in the form of a falling film in positive contact with the inner walls of the tube, all of which is well known to those skilled in the art, e.g., FIGURE 4 of the aforesaid Cross patent.

In the system diagrammed in the figure, the boiling juice vapors of the first evaporator unit 10A are brought into heat exchange relation through duct 60 with juice being circulated to the nest of heat exchange tubes in second effect evaporator 10B, and the boiling juice vapors in the second effect evaporator are delivered through duct 62 into heat exchange relationship with the nest of tubes for the third effect evaporator. Thus boiling juice vapors introduced to the shell surround the nest of heat exchange tubes therein and transfer their heat of liquefaction to juice traveling downwardly in contact with the inner walls of the heat exchange tubes in unit 10C, the concentrated juice being collected at sump 70C in the lower extremity of evaporator 10C with the vapors introduced to the shell of evaporator unit 10C being condensed therein, collected and removed from the area around the base of the heat exchange tubes through pipe 72C and delivered by vapor condensate pump 74 through line 75 to an ammonia subcooler generally shown at 76. Similarly, concentrated juice from the first effect evaporator 10A is collected in sump 70A. The juice vapors condensed in the second effect evaporator 10B are removed through pipe 72B and delivered through U-shaped vapor condensate trap 78 and pipe 80 communicating with draw-off pipe 72C through the intermediation of the pool for vapor condensate around the lower extremities of the nest of heat exchange tubes in the third effect evaporator.

In operation fresh juice is admitted through control valve 12C in pipe 40 to maintain a fixed level of juice in sump 70C of the third effect evaporator unit; similarly, valve 12B is adjusted to effect a level of juice in the sump 70B of the second effect evaporator and valve 12A in line 46A maintains a suitable level of juice in sump 70A of the first effect evaporator, pneumatic level control means 13A, B and C, respectively, being employed to control the operation of valve means 12A, B and C, sensing devices for the pneumatic liquid control units being in communication with tail pipes 14A, B and C, respectively, the operation of such means being well known to those skilled in the art. Thus, through the operation of the valve means just described the rate at which fresh dilute juice and portions of concentrated juice are supplied to the individual evaporator units is controlled to provide a substantially uniform level of juice in the respective sumps of the various effects.

A vacuum is drawn through lines 90B, 90C and 90D communicating with evaporator units 10B and 10C and vapor condenser 82, respectively. The lines 90B, C and D serve to remove difficultly condensible volatile flavor constituents and non-condensible gases boiling over with juice vapors. The suction drawn through lines 90B, C and D is effected by any well known steam ejection system, the design of which is well known to those skilled in the art, a three stage steam ejection system with a hogging jet being generally shown at 92.

Hence, in operation fresh dilute juice delivered to the system through pipe 40 will be evaporated and concentrated through the successive stages of evaporator units 10C, 10B and 10A and eventually delivered by circulation pump 42A through product pipe 48A to additional evaporators for further concentration and subsequent combination with other juice constituents for aromatizing the juice, as will be hereinafter described; the boiling juice vapors produced in the third effect evaporator 10C are removed therefrom through vapor duct 64 and delivered to a tube-type vapor condenser 82 in heat exchange relationship with the vapors, cold liquid ammonia circulating through the tubes of the condenser 82 bringing about condensation of the vapors around the tubes in condenser 82, wherefrom the condensed vapors are collected at sump 84 delivered through pipe 85 to pump 86 and pipe 88 which delivers the juice vapor condensate to means for further concentration in accordance with the present invention. The juice vapors condensed in the third effect evaporator 10C and removed through pipe 72C are circulated by pump 74 through line 75 to an ammonia subcooler generally shown at 76. Liquid from ammonia receiver 27 reaches the subcooler 76 through line 27A, ammonia subcooler 76 serving to further cool liquid ammonia by having the relatively cooler waste condensate in line 75 brought into heat exchange relation with the liquid ammonia. Thus the temperature of ammonia circulated through line 77 and level control means 27B to vapor condenser 82 is lowered and the efficiency of the vapor condenser is increased. In this connection the heat transferred from juice vapors in the condenser 82 is transferred to the liquid ammonia, the latter being recirculated back to pump 25 through suction line 27D.

Thus, the liquid phase recovered by the condenser 82 is essentially the vapor condensate of fresh dilute juice and is substantially free of the difficultly condensible vapors and noncondensible gases such as nitrogen, carbon dioxide and oxygen. This liquid phase is recovered in the course of initial concentraion of fresh juice by subjecting the juice to reduced subatmospheric pressures generally less than 1½″ of mercury absolute and ranging typically downward to about ½″ of mercury and below; as indicated previously the fresh dilute juice is subjected to such evaporation at temperatures which will not occasion degradation of the various desirable essences evaporated but generally will be at a temperature above about 70° F. and not exceed about 140° F., the range of temperature sensitivities varying, of course, for various juices. The liquid phase contains various constituents (predominantly water) many of which boil at temperatures higher as well as lower than that of water. In general, this liquid phase will be recovered as a minor proportion by weight of the fresh juice being subjected to evaporation in the third effect and, typically, in the case of citrus juice, will be in the neighborhood of 5–15% by weight of the fresh dilute juice.

This liquid phase is subjected in accordance with the present invention to a redistillation to recover a desired oily-watery fraction. Thus, the liquid phase in pipe 88 is introduced to an evaporator unit wherein it is caused to travel in the form of a thin film along a preferably elongated heat exchange surface which is in heat exchange relationship with a hot gas or liquid, typically, hot ammonia gas. One form of evaporator comprises a tube-type evaporator having a plurality of vertically arranged elongated tubes suitably nested at their upper and lower extremities and adapted to receive the liquid phase delivered thereto from pipe 88. Preferably an evaporator of the type shown in the aforesaid Cross patent is employed, a suitable distributor pipe such as that shown in FIGURE 4 of Cross being located at the upper mouth of each tube to cause the liquid phase to travel uniformly down along the inside heat exchange surface thereof. Hot ammonia gas from compressor 25 is delivered through inlet pipe 114 communicating with shell 116 surrounding the nest of tubes, hot ammonia gas being thereby placed in heat exchange relation with the liquid films forming within the tubes and thereby bringing about transfer of sensible heat and latent heat of evaporation to the liquid phase; hot ammonia gas condensing around the tubes is contained within and removed from the shell as a liquid through liquid ammonia pipe 118 communicating with ammonia receiver 27. Substantially all of the low boiling constituents (relative to the boiling point of water) together with certain high boiling constituents are volatilized in the tubes and conducted through duct 120 to vapor condenser 126 wherein they are condensed. The balance of the liquid phase in the tubes which has not volatilized contains high boiling constituents which are undesirable and these materials are collected in a suitable sump generally shown as 122 and pumped as at 124 to a suitable waste. Generally the waste from the liquid phase will be a majority by weight of the liquid phase being treated in the evaporator, typically, 85-95 parts by weight of the liquid phase. Condenser 126 is of the tube-type and has the vapors condensed therein by means of liquid ammonia in the neighborhood of 30° F.; the vapors condensed around the tubes of the condenser 126 are collected as an oily-watery fraction and are removed therefrom by means of pump 130 communicating with condenser shell 132 through pipe 134. An ammonia gas line 138 connects the shell of condenser 126 with the shell of the surge drum of level control means 27B wherefrom gas is recirculated through line 27D to compressor 25. A vacuum line 140 connects the shell of condenser 126 with vapor condenser 82 from which it derives its vacuum, the latter being under negative pressure from the vacuum system generally indicated at 92. Thus, the liquid phase entering the redistillation unit is subjected to a reduced absolute pressure generally between 1½ and ½" of mercury and below. The temperature of the liquid phase entering the redistillation unit will typically be about 60° F. and generally should be at a temperature whereat low and high boiling constituents are maintained in the liquid phase. The temperature of the liquid phase in the redistillation unit should be above that temperature where, at the particular pressure employed, approximately 10% the liquid phase will be volatilized and recovered as an oily-watery condensate fraction in condenser 126; the yield of oily-watery fraction condensate will be dependent upon a number of variables including the total area of the heat exchange surface to which the liquid phase may be exposed, the temperature on said surface, the absolute pressure existing in the redistillation unit and the duration of exposure of the liquid phase to any particular temperature. Any volatile constituents vaporized in the course of redistillation and not collected by condenser 126 will be circulated through vacuum pipe 140 to vapor condenser 82 whereby such vapors may be condensed and recycled or in the case of highly volatile or noncondensible constituents removed through vacuum line 92.

As indicated previously the discovery that the high as well as low boiling components of this oily-watery fraction are useful in enhancing a juice concentrate with a well rounded and complete flavor and aroma was to some extent unexpected since it had been previously believed that only the low boiling constitutents were useful in this capacity and since the higher boiling constituents had been generally classed as a group making no desirable contribution to flavor and aroma and, indeed, detracting from over-all acceptability. One explantation for the acceptability of the oily-watery fraction recovered may be the presence therein among the high boiling constituents of sack oils believed by some early prior art workers to be derived from juice extracts of the citrus fruits. The oily-watery fraction may be added back directly to the concentrate or to so-called cut-back juice, i.e., the fresh dilute juice to which concentrate has heretofore been added, to give the concentrates a natural flavor. However, it is an advantage of the present oily-watery fraction that cut-back juice need not be employed in preparing suitably flavored finished concentrates and, indeed, it is a preferred practice not to employ cut-back juice but to add the oily-watery fraction to juice concentrate. Collateral to this advantage, therefore, is the practicality of concentrating the juice to a lower density than that to which juice concentrate is normally reduced, the practice of adding cut-back juice is no longer necessary. Thus, orange juice concentrate produced in accordance with the present invention will have a density of about 45° Brix and will be adjusted to a Brix of about 42° by addition of the oily-watery fraction it being the preferred practice to add approximately 5% of the oily-watery fraction to the juice concentrate. It is believed by some workers in the prior art that the presence of oxygen and carbon dioxide and possibly other unknowns in orange juice concentrate is detrimental to flavor stability. By virtue of the elimination of most if not all of these constituents in the course of concentration of the citrus juice and by the avoidance of the need for cut-back juices which contain many of these undesirables such as oxygen and carbon dioxide the flavorful juice concentrate is found to be quite stable and the need for nitrogen sparging or other "inert" maintenance is reduced.

It will be noted from the foregoing description that the heat of the compressed refrigerant gas is employed both (1) to boil the juice and separate therefrom desired volatiles containing flavor-producing constitutents which boil at temperatures above and below that of water; and (2) to distill from the two-phase oily-watery mixture recovered by condensation a fraction containing said high and low boiling flavor-producing constituents. It will also be noted that when the hot compressed refrigerant gas is brought into heat exchange relation with the juice and the juice condensate it surrenders its heat and liquefies, whereafter it is recycled to a receiver and eventually may be used to condense either the volatiles recovered by boiling the juice or the desired flavor fraction recovered upon condensation. Advantageously, therefore, the flavor fraction of use is recovered as part of a cycle wherein the refrigerant gas is also employed to concentrate the juice. By repeatedly recirculating the refrigerant the latent heat of the refrigerant in a compressed condition may be utilized to supply heat for evaporation and the liquefied refrigerant may be employed to receive heat from vapors where a vapor condensate is to be recovered from the system.

It should be further noted that the flavor fraction of use eventually recovered will in the case of orange or other citrus juices appear somewhat milky but when allowed to settle will be seen to separate into a watery-phase superposed by an oily-phase. In practice a larger amount of oily-phase is recovered than is actually desired for use and a majority of that which is collected and used is of the watery-phase. As a consequence after a substantial portion of this oily-watery fraction is recovered that which is to be used will be separated from that which is not to be used such as by permitting the emulsion to settle in an elongated chamber and thereby separate into its respective phases which phases are then separated so that at least a majority and preferably a large majority of the fraction used will contain the constituents of the watery-phase.

While the present invention has been described with particular reference to specific examples, it is not to be limited thereby, but reference is to be had to the appended claims for a definition of its scope.

What is claimed is:

1. Process of separating and recovering from citrus fruit juice a specific fraction of volatile constituents whose boiling points are below and above that of water, comprising separating the juice into a major concentrated juice portion and a minor volatile portion which contains said volatile flavor-producing constituents and non-condensible gaseous constituents by subjecting the juice to a high vacuum concentration operation at a temperature less than 120° F., condensing a major proportion of the volatile flavor-producing constituents as a first two-phase oily-watery mixture and evacuating uncondensed volatile constituents and non-condensible gases as a minor proportion of the volatile portion, discarding said minor proportion of the volatile portion, and thereafter distilling a flavorful and aromatic mixture of said high and low boiling constituents from the resulting two-phase oily-watery mixture at a temperature below 100° F. and an absolute pressure of less than 1½" of mercury by causing a thin film of said two-phase oily-watery mixture to travel along a heat exchange surface and condensing a minor subfraction of said mixture, a major portion of said minor subfraction being a watery-phase and a minor portion of said minor subfraction being an oily-phase.

2. A process of fortifying a citrus fruit juice with a specific fraction of volatile constituents whose boiling points are above and below that of water, comprising separating the juice into a major concentrated juice portion and a minor volatile portion which contains said volatile flavor-producing constituents and non-condensible gaseous constituents by subjecting the juice to a high vacuum concentration operation at a temperature less than 120° F., condensing a major proportion of the volatile flavor-producing constituents as a first two-phase oily-watery mixture and evacuating uncondensed volatile constituents and non-condensible gases as a minor proportion of the volatile portion, discarding said minor proportion of the volatile portion, thereafter distilling a flavorful and aromatic mixture of said high and low boiling constituents from the resulting two-phase oily-watery mixture at a temperature below 100° F. and an absolute pressure of less than 1½" of mercury by causing a thin film of said two-phase oily-watery mixture to travel along a heat exchange surface and condensing a minor subfraction of said mixture, a major portion of said minor subfraction being a watery phase and a minor portion of said minor subfraction being an oily-phase, and combining said minor subfraction with juice concentrate.

3. A process of fortifying a citrus fruit juice with a specific fraction of volatile constituents whose boiling points are above and below that of water which comprises bringing the juice to a temperature of 40°–120° F. under an absolute pressure less than 1½" of mercury in a closed system to partially concentrate said juice by separating it into a major concentrated juice portion and a minor volatile portion which contains said volatile flavor-producing constituents and non-condensible gaseous constituents, subjecting said minor volatile portion to condensation at such temperatures that the major proportion of the volatile flavor-producing constituents therein are collected as a first two-phase oily-watery mixture, evacuating uncondensed volatile constituents and non-condensible gases as a minor proportion of said minor volatile portion, discarding said minor proportion of the volatile portion, distilling a flavorful and aromatic mixture of said high and low boiling constituents from the resulting two-phase oily-watery mixture at a temperature below 100° F. and an absolute pressure less than 1½" of mercury by causing a thin film of said two-phase oily-watery mixture to travel along a heat exchange surface and condensing a minor subfraction of said mixture, a major portion of said minor subfraction being a watery-phase and a minor portion of said minor subfraction being an oily-phase, combining the watery-phase and a portion of the oily-phase of said condensed minor subfractions with previously concentrated juice, and thereafter packaging and freezing said combined juice concentrate and the combined phases of said minor subfraction.

4. A process of fortifying a citrus fruit juice with a specific fraction of volatile constituents whose boiling points are above and below that of water, which comprises bringing the juice to a temperature above about 40° F. and below about 120° F. under an absolute pressure of less than 1½" of mercury in a closed system to partially concentrate said juice by separating it into a major concentrated juice portion and a minor volatile portion which contains said volatile flavor-producing constituents and non-condensible gaseous constituents, subjecting said minor volatile portion to condensation at such temperatures that the major proportion of the volatile flavor-producing constituents therein are collected as a first two-phase oily-watery mixture, evacuating uncondensed volatile constituents and non-condensible gases as a minor proportion of said minor volatile portion, discarding said minor portion of the volatile portion, distilling a flavorful and aromatic mixture of said high and low boiling constituents from the resulting two-phase oily-watery mixture at a temperature below 100° F. and an absolute pressure of less than 1½" of mercury by causing a thin film of said two-phase oily-watery mixture to travel along a heat exchange surface and condensing a minor subfraction of said mixture, a major portion of said minor subfraction being a watery-phase and a minor portion of said minor subfraction being an oily-phase, further concentrating said concentrated juice portion, and combining the condensed minor subfraction with said further concentrated juice portion.

5. A process according to claim 4 wherein the watery-phase and the oily-phase of said minor subfraction are separated, and thereafter combining the watery-phase and a portion of the oily-phase of said minor subfraction with said further concentrated juice portion.

6. A process according to claim 5 wherein a portion of whole citrus juice is added to the combination of juice concentrate and said minor subfraction.

7. A process of fortifying orange juice with a specific fraction of volatile constituents whose boiling points are above and below that of water, which comprises rapidly flowing the juice in a thin continuous film over a heat exchange surface at a temperature between 40°–120° F. under an absolute pressure less than 1½" of mercury in a closed system to partially concentrate said juice by separating it into a major concentrated juice portion and a minor volatile portion which contains said volatile flavor-producing constituents and non-condensible gaseous constituents, subjecting said volatile portion to a condensation at such temperatures that the major proportion of the volatile flavor-producing constituents therein are collected as a first two-phase oily-watery mixture, evacuating uncondensed volatile constituents and non-condensible gases as a minor proportion of said minor volatile proportion, distilling a flavorful and aromatic mixture of said high and low boiling constituents from the resulting two-phase oily-watery mixture at a temperature of 50°–100° F. and an absolute pressure of less than 1½" of mercury in a closed system to further concentrate said first two-phase mixture by condensing a minor subfraction thereof, a major portion of said minor subfraction being a watery-phase and a minor portion of said minor subfraction being an oily-phase, further concentrating said concentrated juice portion, and combining the condensed watery-phase and at least a portion of the oily-phase of said minor subfraction with said concentrated juice portion.

8. The process according to claim 7 wherein said minor subfraction is collected by condensation at temperatures of 30°–70° F. and the combined phases of the minor subfraction and the concentrated juice portion are frozen.

9. The process of claim 8 wherein a portion of the whole orange juice is added to the combination of the phases of the minor subfraction and the concentrated juice portion.

10. The frozen product of claim 8.

11. The process according to claim 7 wherein the juice is boiled at a temperature between 40°–80° F. to concentrate it initially and separate said minor volatile portion therefrom, the condensate of said minor volatile portion constituting 5–15% by weight of the unconcentrated juice.

12. Continuous process for producing flavor-enhanced citrus fruit juice by concentrating a heat sensitive citrus fruit juice and separating and recovering therefrom a specific fraction of volatile constituents whose boiling points are above and below that of water, comprising utilizing the heat contained in a compressed refrigerant gas to boil the juice at relatively low temperatures under vacuum to partially concentrate said juice by separating it into a major concentrated juice portion and a minor volatile portion which contains volatile flavor-producing constituents, water and non-condensible gaseous constituents, liquefying and causing the refrigerant to cool to a temperature substantially below the temperature of said minor volatile portion, using the cool liquefied refrigerant to condense a major proportion of said minor volatile portion as a first two-phase oily-watery mixture, evacuating uncondensed volatile constituents and non-condensible gases as a minor proportion of said minor volatile portion, discarding said minor proportion of the volatile portion, utilizing the heat contained in another portion of said compressed refrigerant gas for concentrating said two-phase oily-watery mixture by distilling a flavorful and aromatic mixture of said high and low boiling constituents from the resulting two-phase oily-watery mixture at a temperature below 100° F. and an absolute pressure of less than 1½" of mercury by causing a thin film thereof to travel along a heat exchange surface, using a portion of said cool liquefied refrigerant to condense a minor subfraction of the constituents volatilized from said two-phase oily-watery mixture to condense a minor subfraction containing a watery phase and an oily phase, a major portion of said minor subfraction being the watery phase and a minor proportion of said minor subfraction being the oily phase, and combining the latter subfraction with a portion of said concentrated juice.

13. Continuous process for producing flavor-enhanced orange juice by concentrating a heat sensitive orange juice and separating and recovering therefrom a specific fraction of volatile constituents whose boiling points are above and below that of water, comprising utilizing the heat contained in a compressed refrigerant gas for boiling the juice at relatively low temperatures under vacuum to partially concentrate said juice by separating it into a major concentrated juice portion and a minor volatile portion which contains volatile flavor-producing constituents, water and non-condensible gaseous constituents, liquefying and causing the refrigerant to cool to a temperature substantially below the temperature of said minor volatile portion, introducing said liquefied refrigerant and said minor volatile portion to a heat exchanger to condense a major portion of said minor volatile portion as a first two-phase oily-watery mixture and to evaporate the liquid refrigerant, discarding uncondensed volatile constituents and said non-condensible gases as a minor proportion of said minor volatile portion, recompressing said evaporated refrigerant gas, utilizing the heat contained in said compressed refrigerant gas for concentrating said two-phase oily-watery mixture by distilling a flavorful and aromatic mixture of said high and low boiling constituents from the resulting two-phase oily-watery mixture at a temperature between 50°–100° F. and an absolute pressure less than 1½" of mercury by causing a thin film of said two-phase oily-watery mixture to travel along a heat exchange surface, and utilizing a portion of said cool liquefied refrigerant to condense a minor subfraction of the volatiles distilled from said two-phase oily-watery mixture so as to contain a watery phase as a major portion of said minor subfraction and an oily phase as a minor portion of said minor subfraction.

References Cited in the file of this patent

UNITED STATES PATENTS

| | | |
|---|---|---|
| 2,450,774 | Zahm | Oct. 5, 1948 |
| 2,513,813 | Milleville | July 4, 1950 |
| 2,625,505 | Cross | Jan. 13, 1953 |
| 2,891,865 | Seltzer | June 23, 1959 |
| 2,911,308 | Smith | Nov. 3, 1959 |